Patented Aug. 15, 1944

2,355,702

UNITED STATES PATENT OFFICE 2,355,702

REMOVAL OF NITROGEN OXIDES FROM SULPHURIC ACID

Winslow A. Brooks, Elizabeth, N. J., assignor to E. I. du Pont de Nemours & Company, Wilmington, Del., a corporation of Delaware No Drawing. Application August 7, 1942, Serial No. 454,017

4 Claims. (Cl. 23—172)

This invention relates to the removal of nitrogen oxides from sulphuric acid having a strength less than about 90% and preferably stronger than about 50%, and is particularly directed to processes in which the sulphuric acid is treated with a sulphamate.

In the manufacture of sulphuric acid nitrogen oxides are introduced as a result of the chamber process and are present in small amounts in the chamber acid or in contact sulphuric acid made by fortifying chamber acid. For many applications the presence of traces of nitrogen oxides in the sulphuric acid is objectionable and it is desirable therefore to provide simple and effective means for removal of the nitrogen oxides.

According to the methods heretofore available it has been suggested to add ammonium compounds such as ammonium sulphate, ammonium chloride or urea, for the purpose of reducing the nitrogen oxides. See, for example, Lunge—4th edition, volume 1, part II, p. 1069; Journal of Chemical Industry (USSR) vol. 17 (1940), pp. 47-49; Abstracts—Chemical Abstracts, vol. 34, July 20, 1940, p. 4867; and U. S. Patent 2,196,686. Many of these have not proved entirely satisfactory and, in fact, the Journal citation suggests that the cheapest method is to pass air through the acid at 140° C. Moreover, all these methods, including the last-named one, require that the acid be heated to a relatively high temperature in order for the nitrogen oxides to be expelled or decomposed.

I have now found that the disadvantages of the prior art may be avoided insofar as acids having a concentration less than 90%, preferably greater than 50%, are concerned simply by treating the acid with a sulphamate. When a sulphamate such as hydrogen (sulphamic acid) or ammonium sulphamate, or other salt of sulphamic acid, is added to sulphuric acid having a strength less than 90% by weight the dissolved nitrogen oxides are readily and effectively decomposed at ordinary temperatures, thus obviating the necessity encountered in the prior art processes of heating the acid to effect removal of these undesirable constituents.

My invention is simple and requires little further explanation except to point out that the acid concentrations are critical and the advantages of the invention are not obtained with acids of 66° Bé. or 98% strengths. With concentrations upwards of 90% strength the removal of nitrogen oxides is only partially effective or requires the application of heat. At the higher concentrations the sulphamates are not as effective as urea whereas at the lower concentrations they are not only more effective but accomplish the same results without the necessity of heating the acid. In this regard the following examples, in which the parts are by weight, are illustrative.

EXAMPLE 1

Regular 60° chamber acid containing 0.0056% $N_2O_3$ was treated with 0.05% of the reagents listed in the following table and bubbled with air for 7 hours at a temperature approximately 60° F. The results for both quantitative and qualitative tests for nitre in the treated acids are given in the following table:

Table I

| Reagent | $N_2O_3$ | Ring test |
|---|---|---|
| Ammonium sulphate | .0056 | Yes. |
| Urea | .0030 | Yes. |
| Sulphamic acid | .0000 | No. |
| Ammonium sulphamate | .0003 | No. |

From these data it appears that ammonium sulphate is wholly ineffective and that urea is not sufficiently effective to meet the usual qualitative ring test, notwithstanding the accelerating effect of the air which was bubbled through the acid. Both sulphamic acid and ammonium sulphamate were effective.

The following example further shows the superiority of sulphamic acid when the treatment is conducted at ordinary temperatures without heating.

EXAMPLE 2

Regular 60° Bé. chamber acid having the nitre content indicated at the start of the test is treated first with the same amount of sulphamic acid as in Example 1 and then with smaller amounts. Air was bubbled through the treated acid at 60° F. and samples were taken and tested every hour.

Table II

| Time | 0.05% $N_2O_3$ | 0.0025% $N_2O_3$ | 0.012% $N_2O_3$ | 0.006% $N_2O_3$ |
|---|---|---|---|---|
| Start of test | .0056 | .0040 | .0040 | .0040 |
| Bubble 1 hour | .0045 | .0025 | .0025 | .0025 |
| Bubble 2 hours | .0004 | .0003 | .0020 | .0020 |
| Bubble 3 hours | .0001 | .0001 | .0020 | .0020 |
| Bubble 4 hours | .0000 | .0000 | .0020 | .0020 |

It thus appears that sulphamic acid is effective at concentrations of 0.05 and 0.025% to reduce the nitre to innocuous value inside of three hours. Substantial reduction is also effected inside of 4 hours with the smaller quantity.

EXAMPLE 3

Regular 60° Bé. chamber acid containing 0.0040% $N_2O_3$ was treated with (a) 0.012% sulphamic acid and (b) 0.006% sulphamic acid and the two treatments were allowed to stand overnight. Analysis showed the acid of each treatment to have a nitre content of less than 0.0000. In each test the acid was first bubbled with air until the nitre content had become constant at 0.0020 (see Table II) and thereafter allowed to stand overnight. Thus when bubbling with air is ineffective further to reduce the nitre a period of standing to allow the sulphamic acid to interact with the nitre is effective.

EXAMPLE 4

Two million pounds of regular 60° Bé. chamber acid containing 0.0031% $N_2O_3$ was treated with 0.006% sulphamic acid. The sulphamic acid was added as an aqueous solution and mixed in by agitating the acid by means of compressed air introduced through a half-inch air stick in the center of a 25-foot tank. After a period of 7 days at a temperature of about 40° F. the nitre content was not appreciably affected. An additional 0.006 sulphamic acid was then added. On the eighth day of $N_2O_3$ content was 0.0020% and on the fourteenth day it was 0.0005%. The temperature remained at about 40° F. throughout the treatment. From these data it appears that the 0.006% sulphamic acid had little effect at the relatively low temperature of 40° F., but that when the sulphamic acid was increased by 0.006%, making a total of 0.012%, the nitre content rapidly dropped off.

EXAMPLE 5

An example of the acid from Example 4 taken on the eighth day and containing 0.0020% $N_2O_3$ was heated to 100° F. and allowed to stand overnight at 100° F. whereupon analysis showed it to contain less than 0.0000% $N_2O_3$.

EXAMPLE 6

Two and one-half million pounds of regular 60° Bé. chamber acid containing approximately 0.004% $N_2O_3$ was treated with sulphamic acid in the amount to give 2 parts by weight sulphamic acid for each part by weight of $N_2O_3$ and mixed as described in Example 4. At the end of 7 days, during which the temperature was about 60° F., the nitre was reduced to less than 0.0003% $N_2O_3$.

While I have described my invention with reference to particular examples and particular conditions it is to be understood that variations may be made without departing from the spirit and scope of the invention as described herein and set out in the appended claims.

In place of sulphamic acid I may use the salts of sulphamic acid, such as the sodium and ammonium salts, in suitable proportions preferably equal to or slightly in excess of the stoichiometric proportions of 2 mols for each mol of $N_2O_3$. The amount required is dependent upon the amount of nitrogen oxides in the sulphuric acid, the temperature and the time of treatment, and since nitrogen oxides are usually present only as traces, say less than about 0.1%, only small amounts of the sulphamate are required. Any amount up to about 0.3% will accomplish at least in part the primary objects of my invention and larger quantities though normally unnecessary may be used. Preferably an equivalent of the sulphamate or more is used.

Suitable temperatures are those which the acid obtains in storage. In other words, the treatment may be effected without heating the acid. It is desirable that the temperature be above 40° F., however, because at the lower temperatures excessive quantity of the sulphamate is required. Lower temperatures also slow down the reaction and prolong the time necessary to effect the reduction of the nitre. It does not appear that temperatures above 100° F. are necessary but higher temperatures may be used so long as they are not so high as to promote hydrolysis of the sulphamate.

My invention is of particular advantage in that it effects removal of the nitrogen oxides without necessitating the application of heat to raise the acid to a relatively high temperature. Should it be necessary or desirable in some instances, as, for example, in the wintertime, to heat the acid the invention still offers a substantial improvement over the prior art processes in that the amount of heating required is substantially less.

The term "sulphamate" as used herein is intended to include hydrogen sulphamate (sulphamic acid) which has the formula $HOSO_2NH_2$ as well as the salts of sulphamic acid such as ammonium sulphamate.

I claim:

1. In a process for removing nitrogen oxides from sulphuric acid having a concentration between about 50% and about 90% and less than 0.1% nitrogen oxides, the step of incorporating in the acid a sulphamate in an amount at least equivalent to the nitrogen oxides and not substantially in excess of 0.3% while maintaining a temperature between about 40° F. and about 100° F.

2. In a process for removing nitrogen oxides from sulphuric acid having a concentration between about 50% and about 90% and less than 0.1% nitrogen oxides, the step of incorporating in the acid sulphamic acid in an amount at least equivalent to the nitrogen oxides and not substantially in excess of 0.3% while maintaining a temperature between about 40° F. and about 100° F.

3. In a process for removing nitrogen oxides from sulphuric acid having a concentration between about 50% and about 90% and less than 0.1% nitrogen oxides, the steps of incorporating in the acid a sulphamate in an amount at least equivalent to the nitrogen oxides and not substantially in excess of 0.3% while maintaining a temperature between about 40° F. and about 100° F., and bubbling air thru the thus treated acid.

4. In a process for removing nitrogen oxides from sulphuric acid having a concentration between about 50% and about 90% and less than 0.1% nitrogen oxides, the steps of incorporating in the acid sulphamic acid in an amount at least equivalent to the nitrogen oxides and not substantially in excess of 0.3% while maintaining a temperature between about 40° F. and about 100° F., and bubbling air thru the thus treated acid.

WINSLOW A. BROOKS.